Jan. 28, 1936.  O. R. SKELTON  2,029,132
WHEEL BALANCE
Filed Dec. 13, 1932
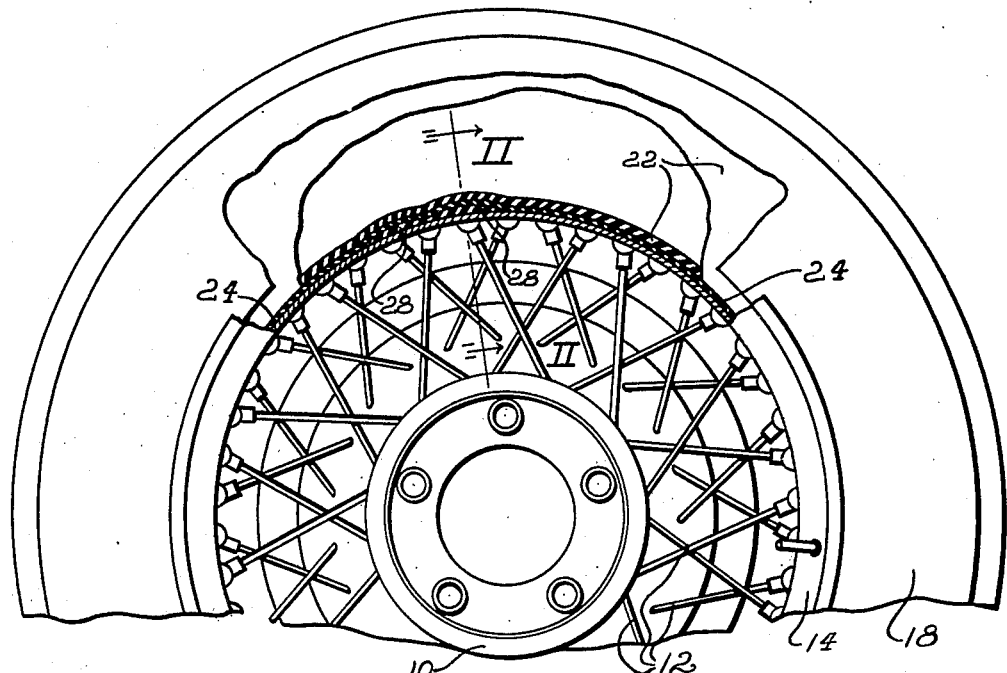
Fig.1.
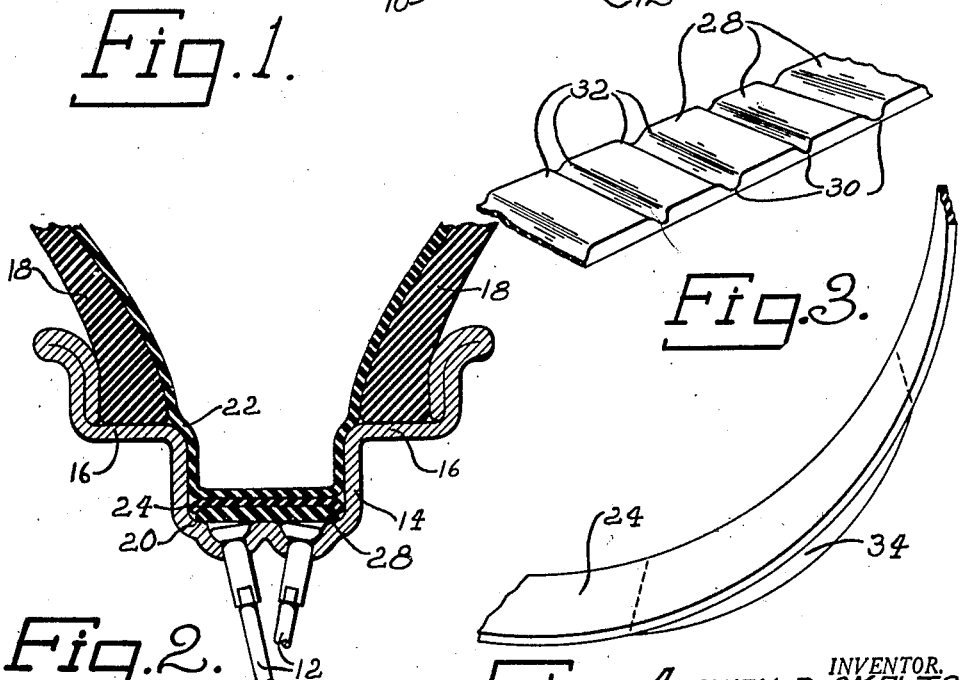
Fig.2.
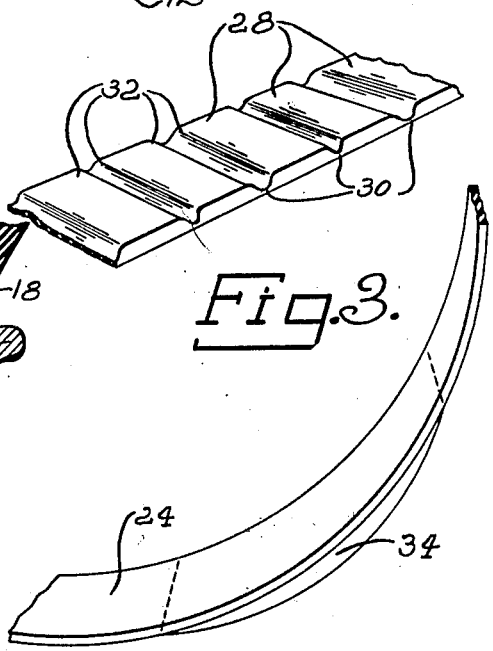
Fig.3.
Fig.4.
INVENTOR.
OWEN R. SKELTON.
BY
ATTORNEYS.

Patented Jan. 28, 1936

2,029,132

UNITED STATES PATENT OFFICE 2,029,132

WHEEL BALANCE

Owen R. Skelton, Grosse Pointe Farms, Mich., assignor to Chrysler Corporation, Detroit, Mich., a corporation of Delaware Application December 13, 1932, Serial No. 647,007

1 Claim. (Cl. 301—5)

This invention relates to a balancing means for wheels and more particularly to a balancing means for use on an automobile wheel.

Recent developments in automobile wheels have been toward larger tires and drop center rims with the result that the diameter of the wheel and the spoke length have been reduced. Heretofore balancing means such as weights have been applied to the spokes or to the inner periphery of the rim but when weights are so applied to wheels of present design, the weights are less effective because the weights are closer to the center. Due to the fact that the diameter of the wheel has been reduced, there is less room between the spokes and consequently the weights cannot be enlarged to compensate for the loss obtained by confining them closer to the center of the wheel.

It is therefore an important object of this invention to provide balancing weights on the outer periphery of the wheel rim so that a weight of variable size may be used, particularly one that is large enough to counterbalance the forces at a point on a comparatively short radius.

Another object of the invention is to retain the weight in its position on the outer periphery of the rim by a liner which is preferably made of elastic material and to place the inner tube over the weight and liner whereby the tube, when inflated, more securely holds the weight in position.

A further object of the invention is to provide a plurality of separable weight members which may be formed in a continuous strip and separated individually or in groups of two or more to provide a single unit of any desired weight.

A further object of the invention is to form the weights from material such that will cause them to be heavy and at the same time to be pliable so as to readily conform to the surface upon which they are placed.

Other objects and advantages of the invention will more fully appear from the following description taken in connection with the accompanying drawing, in which:

Fig. 1 is a side elevation of a portion of a wheel and tire showing a weight applied thereto, parts being broken away and in section;

Fig. 2 is a sectional view taken on the line II—II of Fig. 1 showing an enlarged portion of the wheel and tire;

Fig. 3 is a perspective view of a plurality of connected weights; and

Fig. 4 is a perspective view showing a modification of my invention wherein the weight is secured to a liner.

Referring to the drawing, I have shown a wheel having a hub 10, spokes 12 and a rim 14. The rim shown is of the drop center type having outer peripheral ledges 16, upon which the inner periphery of the tire casing 18 rests, and a central portion 20 of reduced diameter for receiving the inner tube 22. It is understood that the central portion 20 is provided to receive the inner peripheral edges of the casing 18 when it is desired to remove the tire from the rim.

The drop center rim reduces the clearance between the hub 10 and the inner periphery of the rim, and it is difficult to apply balance weight to the inner periphery of the rim or the spokes. With the use of drop center rims it has been found that a tire can be removed and applied without difficulty.

Various methods may be used in locating the place where a balance weight is to be applied on the wheel. This is preferably done while the tire is on the wheel and properly inflated. After it is determined where the weight is to be applied and the weight required to counterbalance is known, that portion of the tire where the weight is to be applied is removed and a unit weight consisting of one or more members is placed on the outer periphery of the rim. The tire is then replaced on the rim over the weight and the tire is inflated. The pressure in the tire holds the weight in position on the rim. Usually a liner such as shown at 24 is placed between the rim and the inner tube 22. This liner is preferably an elastic band which fits over the outer periphery of the rim. When such a band is used one edge thereof is raised and the weight is slid underneath. This band holds the weight in position before the tire is applied, after which the tire with its air pressure holds the weight in place.

Due to the fact that the tire is so easily removed and applied, I have found that this method of balancing is easier than the application of weights to the spokes or inner periphery of the rim, particularly where the distance between the rim and hub is so small and the spokes are so close together.

I preferably form the weight from a compound of rubber and powdered metal, such as iron, lead litharge, copper, etc. The powdered metal is mixed with the rubber and while the rubber is in a plastic state it is molded into weights of convenient size, such as shown in Fig. 3. The weights 28 are formed in strips and each weight is connected to the adjacent weight by a relatively thin strip 30. The upper corners 32 of each weight member 28 are rounded so that there are no sharp edges to cut the inner tube 22 which holds the weights to the rim. Each weight member 28 is formed having a predetermined weight. For example, each member 28 may be two ounces. If it is found that it requires only two ounces to balance the wheel, only one weight is separated from the strip and applied to the wheel, but if it is found that six ounces are required, three weights, joined together by the thin strip 30, are applied to the wheel as above described.

If desired, the rubber and powdered metal weight 34 may be vulcanized or otherwise secured to the liner 24, as shown in Fig. 4. In this form of my invention, when the place of out-of-balance has been determined on the wheel, the liner may be placed on the rim so that the weight 34 is in proper position to counterbalance the wheel. When the liner 24 is formed as an elastic band, it is an easy operation to apply the weights in this manner, and the elastic band grips the periphery of the rim, holding the weight in proper position until the tire and tube are placed on the wheel, after which the inflated tube holds the weight and liner in position.

It will be understood that various changes including the size, shape and arrangement of parts may be made without departing from the spirit of my invention, and it is not my intention to limit its scope other than by the terms of the appended claim.

What I claim is:

The combination in a vehicle wheel having a rim of channel section, a liner over the rim serving as a protective covering for the outer periphery of the base of said channel rim, a tire casing on said rim, an inner tube within said casing in contact with the outer periphery of said liner, of a circumferentially shiftable balancing weight between the adjacent faces of said liner and said rim temporarily held in a predetermined position by said liner and permanently held in position by the pneumatic pressure in said inner tube.

OWEN R. SKELTON.